(12) United States Patent
Cao et al.

(10) Patent No.: US 11,506,225 B2
(45) Date of Patent: Nov. 22, 2022

(54) VACUUM BREAKING DEVICE FOR VACUUM GENERATOR

(71) Applicant: XingYu Electron (Ningbo) CO., LTD, Ningbo (CN)

(72) Inventors: Jianbo Cao, Ningbo (CN); Dongjie Zhu, Ningbo (CN); Guangjing Chen, Ningbo (CN); Xiaoxiong Hu, Ningbo (CN)

(73) Assignee: XINGYU ELECTRON (NINGBO) CO., LTD, Ningbo (CN)

( * ) Notice: Subject to any disclaimer, the term of this patent is extended or adjusted under 35 U.S.C. 154(b) by 588 days.

(21) Appl. No.: 16/587,064

(22) Filed: Sep. 30, 2019

(65) Prior Publication Data

US 2020/0277971 A1 Sep. 3, 2020

(30) Foreign Application Priority Data

Feb. 28, 2019 (CN) .......................... 201910149316.X

(51) Int. Cl.
*F04F 5/52* (2006.01)
*F04F 5/20* (2006.01)
(Continued)

(52) U.S. Cl.
CPC .................. *F04F 5/52* (2013.01); *F04F 5/20* (2013.01); *F16K 31/42* (2013.01); *F16K 31/1221* (2013.01); *Y10T 137/86083* (2015.04)

(58) Field of Classification Search
CPC ........ F01B 31/32; F01B 49/035; F01B 49/22; F01K 9/006; F04B 37/14; F04C 25/02; F04C 27/007; F04D 17/168; F04D 27/008; F04D 27/0215; F04D 27/0292; F04F 5/20; F04F 5/52; F16K 31/1221; F16K 31/42; F16K 51/02; F16K 31/124; F16K 31/1245; F16K 1/52; Y10T 137/86075; Y10T 137/86083
(Continued)

(56) References Cited

U.S. PATENT DOCUMENTS 4,176,674 A * 12/1979 Rodriguez .............. F16K 43/00
251/222
4,861,232 A * 8/1989 Ise ........................... F04F 5/20
248/205.9
(Continued)

*Primary Examiner* — Kevin F Murphy
*Assistant Examiner* — Jonathan J Waddy
(74) *Attorney, Agent, or Firm* — Bayramoglu Law Offices L.L.C

(57) ABSTRACT

A vacuum breaking device for a vacuum generator, includes a main housing, wherein the main body is provided with an air supply port, a vacuum interface chamber and a vacuum generating chamber. An intake passage is arranged inside the main housing, a pilot valve controlled by an electromagnetic pilot valve assembly is arranged between the intake passage and the air supply port. The pilot valve includes a pilot valve body, a pilot valve core and a pilot valve spring. A throttle pipe is arranged axially inside the main housing. A pneumatic on-off valve is arranged between the vacuum interface chamber and the vacuum generating chamber and outside the throttle pipe. The pneumatic on-off valve includes a slide core and a slide core spring, and a control chamber mated with an end surface of the slide core is arranged inside the main housing.

6 Claims, 8 Drawing Sheets

(51) Int. Cl.
*F16K 31/42* (2006.01)
*F16K 31/122* (2006.01)

(58) Field of Classification Search
USPC ............... 137/565.23, 565.22; 251/122, 264
See application file for complete search history.

(56) References Cited

U.S. PATENT DOCUMENTS

| | | | | |
|---|---|---|---|---|
| 5,320,497 | A * | 6/1994 | Nagai | B65G 47/91 |
| | | | | 417/189 |
| 6,416,295 | B1 * | 7/2002 | Nagai | F04F 5/52 |
| | | | | 417/187 |
| 2006/0278282 | A1 * | 12/2006 | Nagai | F04F 5/20 |
| | | | | 264/234 |
| 2009/0032125 | A1 * | 2/2009 | Fukano | F04F 5/02 |
| | | | | 137/565.23 |
| 2019/0353279 | A1 * | 11/2019 | Yu | F04F 5/20 |
| 2019/0382215 | A1 * | 12/2019 | Nakayama | F16K 31/1223 |

* cited by examiner

VACUUM BREAKING DEVICE FOR VACUUM GENERATOR

CROSS REFERENCE TO THE RELATED APPLICATIONS

This application is based upon and claims priority to Chinese Patent Application No. 201910149316.X, filed on Feb. 28, 2019, the entire contents of which are incorporated herein by reference.

TECHNICAL FIELD

The present invention relates to the technical field of manufacturing vacuum generator. More specifically, the present invention is a vacuum breaking device for a vacuum generator.

BACKGROUND

A vacuum generator is a vacuum component using a positive pressure air source to generate a negative pressure, which is novel, efficient, clean, economical, and small-sized. The vacuum generator makes it easy and convenient to obtain negative pressure in a place with compressed air or in a pneumatic system requiring both positive pressure and negative pressure. Vacuum generators are widely applied in industrial automation of various fields such as machinery, electronics, packaging, printing, plastics and robotics.

In an existing vacuum generator system, the vacuum environment is destroyed by natural air leakage after closing the vacuum generating path and speed is relatively slow. Moreover, some vacuum generators have good vacuum maintenance owing to the soft material for sucking at the vacuum port and automatic air leakage is impossible. An external on-off valve is needed for an air jet to the vacuum environment to break the vacuum, resulting in a complicated structure and a troublesome operation. Therefore, the structure of the existing vacuum generator needs to be further improved.

SUMMARY

Based on the prior art, the technical problem to be solved by the present invention is to provide a vacuum breaking device for a vacuum generator having a reasonable structure, a convenient operation, and a function of vacuum maintenance.

The technical solution adopted by the present invention to solve the above technical problems is as follows.

A vacuum breaking device for a vacuum generator includes a main housing, wherein the main housing is provided with an air supply port P, a vacuum interface chamber V2 and a vacuum generating chamber V3, an intake passage A1 is arranged inside the main housing, a pilot valve G controlled by an electromagnetic pilot valve assembly is arranged between the intake passage A1 and the air supply port P, the pilot valve G includes a pilot valve body, a pilot valve core and a pilot valve spring; a throttle pipe is arranged axially inside the main housing, a throttle passage A2 inside the throttle pipe is interconnected to the intake passage A1, a pneumatic on-off valve M is arranged between the vacuum interface chamber V2 and the vacuum generating chamber V3 outside the throttle pipe, the pneumatic on-off valve M includes a slide core and a slide core spring, and a control chamber C mated with an end surface of the slide core is arranged inside the main housing. The main housing is further provided with an exhausting chamber V1, when the pneumatic on-off valve M is opened, the exhausting chamber V1, the vacuum interface chamber V2 and the vacuum generating chamber V3 are interconnected.

The optimized technical measures further include the following:

The main housing is provided with an adjusting mechanism used for adjusting an opening size of the throttle passage A2. The adjusting mechanism includes an adjusting cover. A center of the adjusting cover is screwed with an adjusting core and an adjusting nut is fixed to an outer end of the adjusting core.

The adjusting core is screwed with an adjusting pad on an inner side of the adjusting nut.

An inner end of the adjusting core is a reduced curved surface structure.

A spring seat is arranged inside the adjusting cover. One end of the slide core spring is sleeved outside the spring seat.

A front outer periphery of the slide core is provided with a first Y-type sealing ring. A middle outer periphery of the slide core is provided with a first O-type sealing ring and a rear outer periphery of the slide core is provided with a second Y-type sealing ring.

A front end of the slide core is embedded with a sealing gasket. A rear end of the slide core is embedded with an inner pad and a second O-type sealing ring is arranged between the inner pad and the slide core.

The main housing is mounted with a valve fixed part. The electromagnetic pilot valve assembly is fixed to the valve fixed part and a pilot valve control chamber H is formed between the valve fixed part and an end surface of the pilot valve core.

The valve fixed part is provided with a bump and one end of the pilot valve spring is sleeved outside the bump.

A first irregular sealing element is arranged between the main housing and the valve fixed part. A second irregular sealing element is arranged between the valve fixed part and the electromagnetic pilot valve assembly.

The vacuum breaking device for the vacuum generator of the present invention has a reasonable structure, which is handily operated by providing a pilot valve and a pneumatic on-off valve inside the main housing. A vacuum generating state, a vacuum holding state, and a vacuum breaking state can be realized by the control, and the vacuum state can be quickly broken by vacuum breaking to meet the actual requirements.

DETAILED DESCRIPTION OF THE EMBODIMENTS

Figure 1:
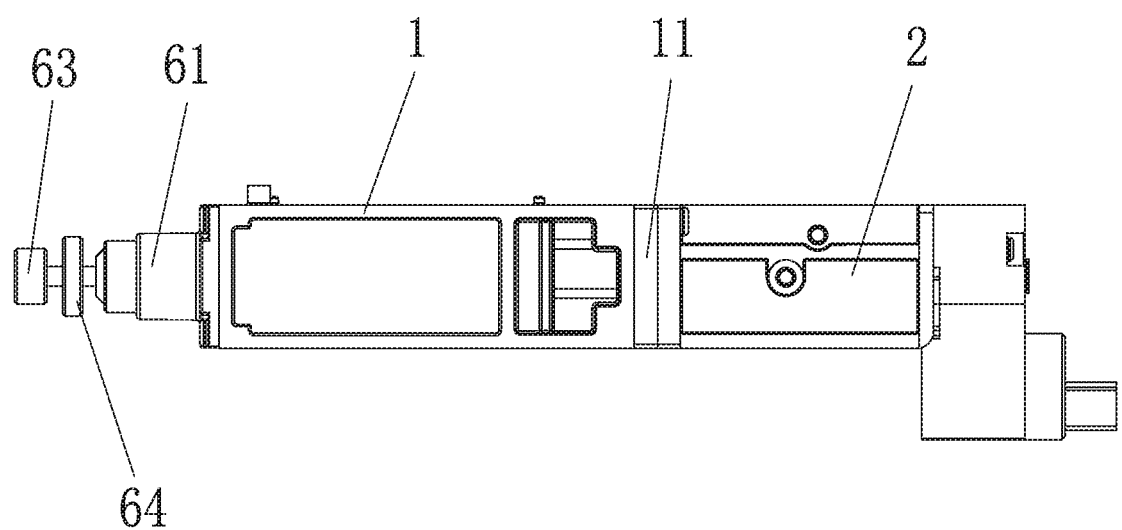
FIG. 1 is a structural schematic view of the present invention.
Figure 2:
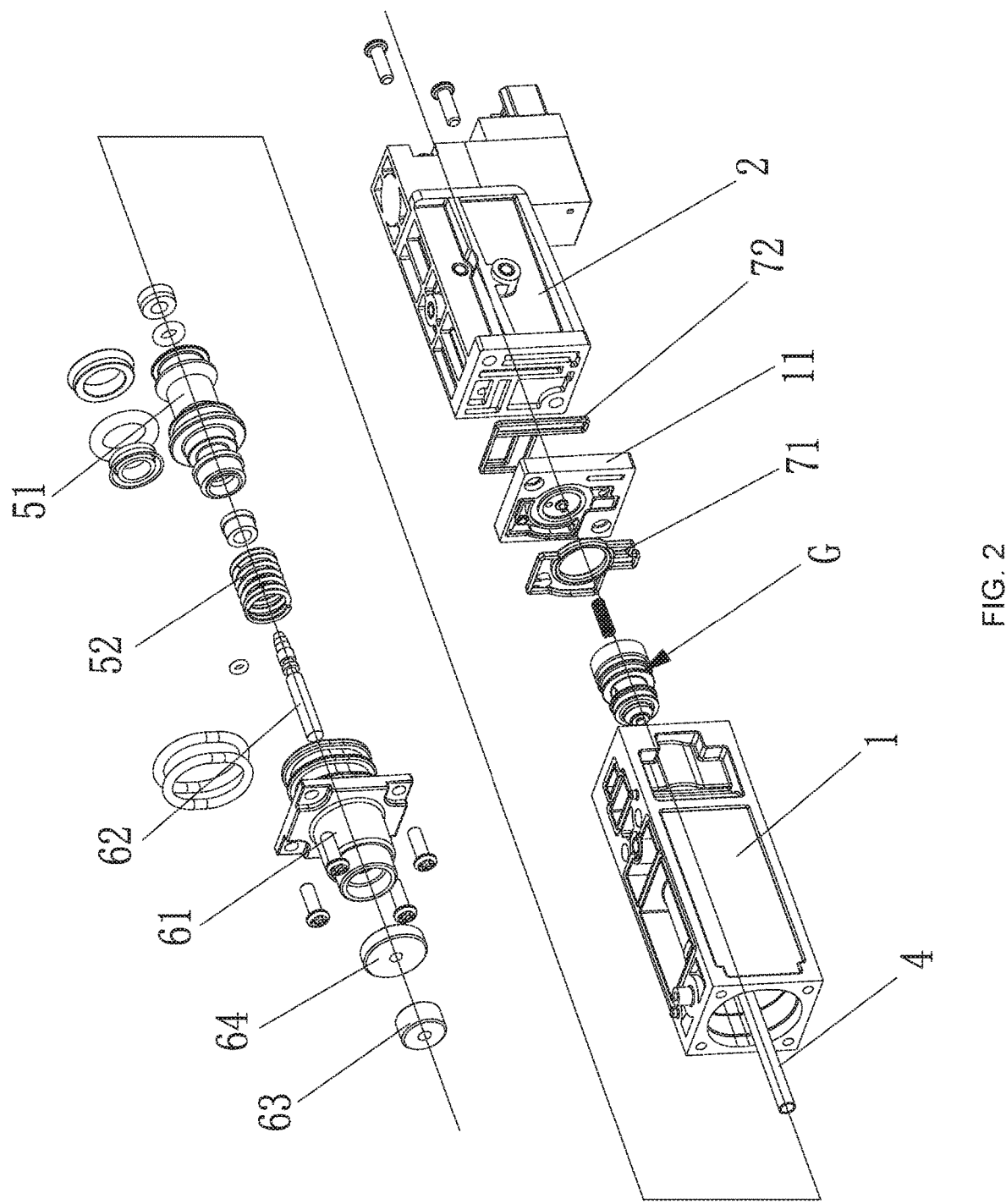
FIG. 2 is an exploded view of the present invention.
Figure 3:
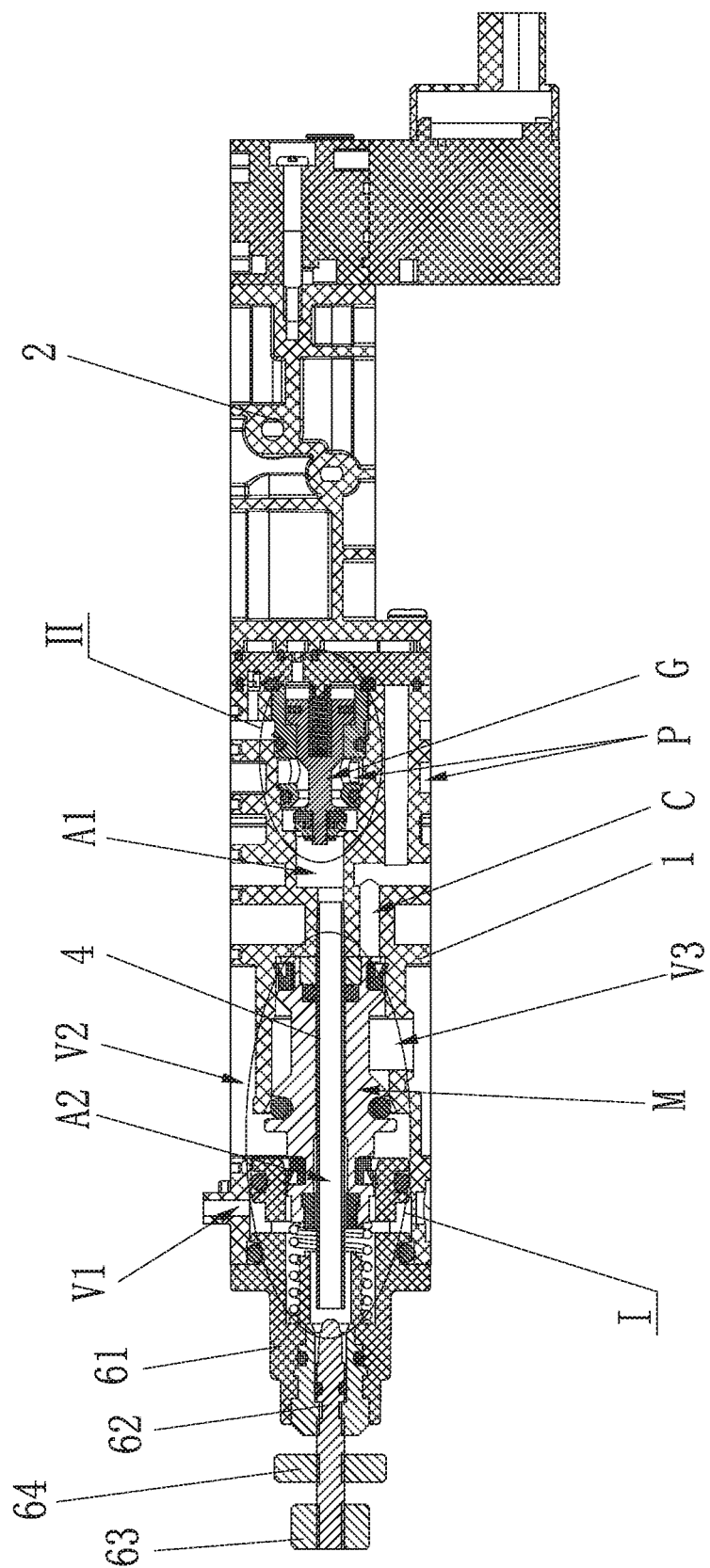
FIG. 3 is a cross-sectional view showing a structure of the present invention.
Figure 4:
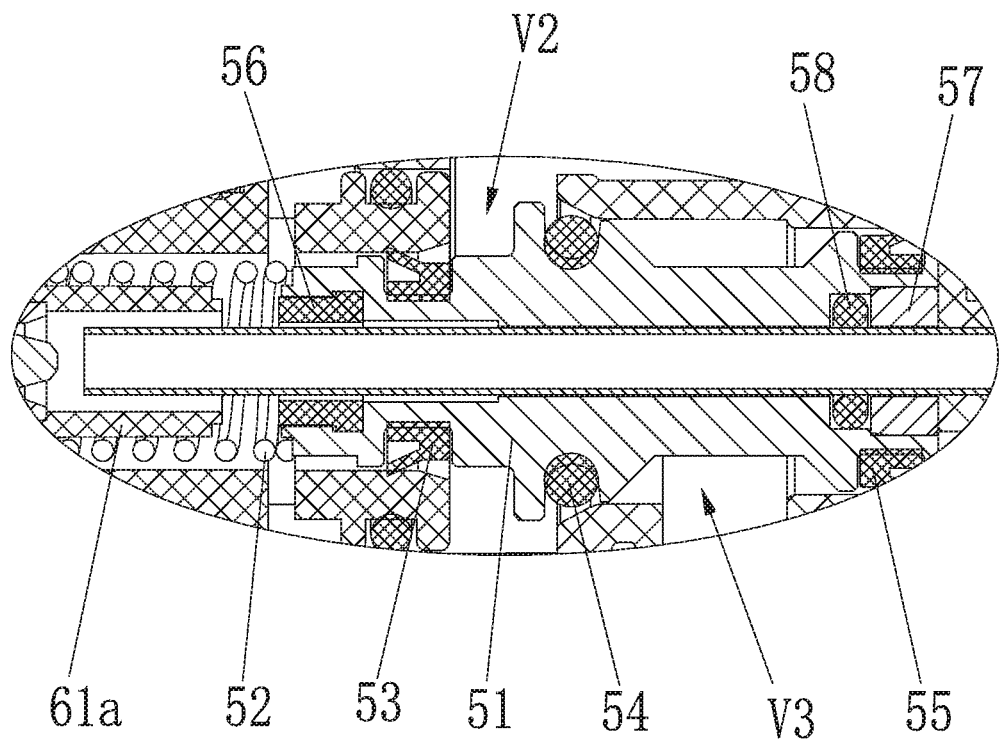
FIG. 4 is an enlarged view of the portion I of FIG. 3.
Figure 5:
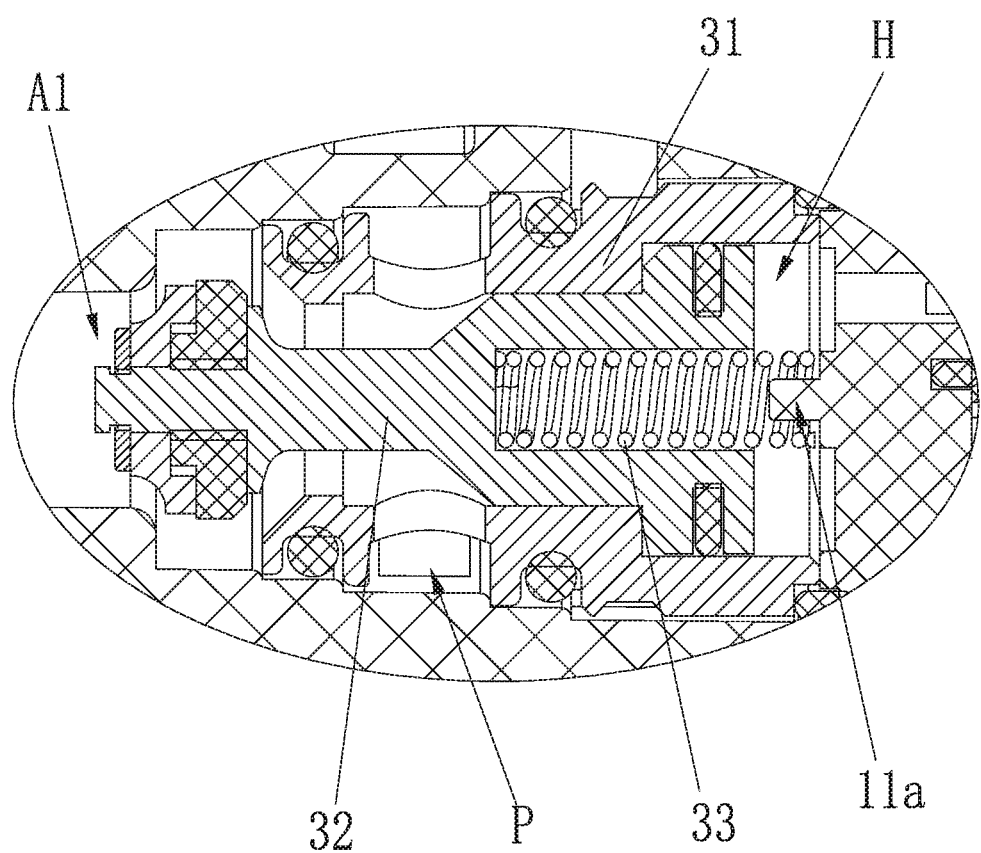
FIG. 5 is an enlarged view of the portion II of FIG. 3.

The present invention will be further described in detail below with reference to the appended drawings and embodiments.

FIG. 1 to FIG. 4 are structural schematic views of the present invention.

The reference numbers are: air supply port P, exhausting chamber V1, vacuum interface chamber V2, vacuum generating chamber V3, intake passage A1, throttle passage A2, pilot valve G, pneumatic on-off valve M, control chamber C, pilot valve control chamber H, main housing 1, valve fixed part 11, bump 11a, electromagnetic pilot valve assembly 2, pilot valve body 31, pilot valve core 32, pilot valve spring 33, throttle pipe 4, slide core 51, slide core spring 52, first Y-type sealing ring 53, first O-type sealing ring 54, second Y-type sealing ring 55, sealing gasket 56, inner pad 57, second O-type sealing ring 58, adjusting cover 61, spring seat 61a, adjusting core 62, adjusting nut 63, adjusting pad 64, first irregular sealing element 71, second irregular sealing element 72.

As shown in FIG. 1 to FIG. 4, a vacuum breaking device for a vacuum generator includes the main housing 1, wherein the main housing 1 is provided with the air supply port P, the vacuum interface chamber V2 and the vacuum generating chamber V3, the intake passage A1 is arranged inside the main housing 1, the pilot valve G controlled by the electromagnetic pilot valve assembly 2 is arranged between the intake passage A1 and the air supply port P, the pilot valve G includes the pilot valve body 31, the pilot valve core 32 and the pilot valve spring 33; the throttle pipe 4 is arranged axially inside the main housing 1, the throttle passage A2 inside the throttle pipe 4 is interconnected to the intake passage A1, the pneumatic on-off valve M is arranged between the vacuum interface chamber V2 and the vacuum generating chamber V3 outside the throttle pipe 4, the pneumatic on-off valve M includes the slide core 51 and the slide core spring 52, and the control chamber C mated with an end surface of the slide core 51 is arranged inside the main housing 1. The main housing 1 is further provided with the exhausting chamber V1, when the pneumatic on-off valve M is opened, the exhausting chamber V1, the vacuum interface chamber V2 and the vacuum generating chamber V3 are interconnected.

In the embodiment, the main housing 1 is provided with an adjusting mechanism used for adjusting an opening size of the throttle passage A2, the adjusting mechanism includes the adjusting cover 61, a center of the adjusting cover 61 is screwed with the adjusting core 62, and the adjusting nut 63 is fixed to an outer end of the adjusting core 62.

In the embodiment, the adjusting core 62 is screwed with the adjusting pad 64 on an inner side of the adjusting nut 63.

In the embodiment, an inner end of the adjusting core 62 is a reduced curved surface structure.

In the embodiment, the spring seat 61a is arranged inside the adjusting cover 61, one end of the slide core spring 52 is sleeved outside the spring seat 61a.

The opening size of the throttle passage A2 can be adjusted by the adjusting mechanism according to different usage environments and usage requirements. The adjusting operation is very convenient. The opening size of the throttle channel A2 can be adjusted by adjusting a screw-in depth of the adjusting core 62. Further, the maximum screw-in depth of the adjusting core 62 can be adjusted by adjusting the position of the adjusting pad 64.

In the embodiment, a front outer periphery of the slide core 51 is provided with the first Y-type sealing ring 53. A middle outer periphery of the slide core 51 is provided with the first O-type sealing ring 54 and a rear outer periphery of the slide core 51 is provided with the second Y-type sealing ring 55.

In the embodiment, a front end of the slide core 51 is embedded with the sealing gasket 56. A rear end of the slide core 51 is embedded with the inner pad 57 and the second O-type sealing ring 58 is arranged between the inner pad 57 and the slide core 51.

In the embodiment, the main housing 1 is provided with the valve fixed part 11, the electromagnetic pilot valve assembly 2 is fixed to the valve fixed part 11 and the pilot valve control chamber H is formed between the valve fixed part 11 and an end surface of the pilot valve core 32.

In the embodiment, the valve fixed part 11 is provided with the bump 11a and one end of the pilot valve spring 33 is sleeved outside the bump 11a.

In the embodiment, the first irregular sealing element 71 is arranged between the main housing 1 and the valve fixed part 11 and the second irregular sealing element 72 is arranged between the valve fixed part 11 and the electromagnetic pilot valve assembly 2.

Working Principle:

The vacuum breaking device for the vacuum generator of the present invention has three operating states: i.e. a vacuum generating state, a vacuum holding state, and a vacuum breaking state. The pneumatic on-off valve M is controlled by the pressure in the control chamber C, and the opening and closing of the valve port between the vacuum generating chamber V3 and the vacuum interface chamber V2 is controlled by the pneumatic on-off valve M; the pilot valve G is controlled by the pressure in the pilot valve control chamber H (the pressure in the pilot valve control chamber H is controlled by the electromagnetic pilot valve assembly 2, when the electromagnetic pilot valve assembly 2 is opened, the air path is opened to pressurize the pilot valve control chamber H), the opening and closing of the valve port between the air supply port P and the intake passage A1 is controlled by the pilot valve G.

Initial State after Installation:

The vacuum interface chamber V2, the exhausting chamber V1, the intake passage A1, and the throttle passage A2 are all in communication with the atmosphere, and in zero pressure. The vacuum generating chamber V3 and the control chamber are in zero pressure, the pneumatic on-off valve M is closed; the working pressure is introduced to the air supply port P, the pilot valve control chamber H is zero pressure, the pilot valve G is closed.

Figure 6:
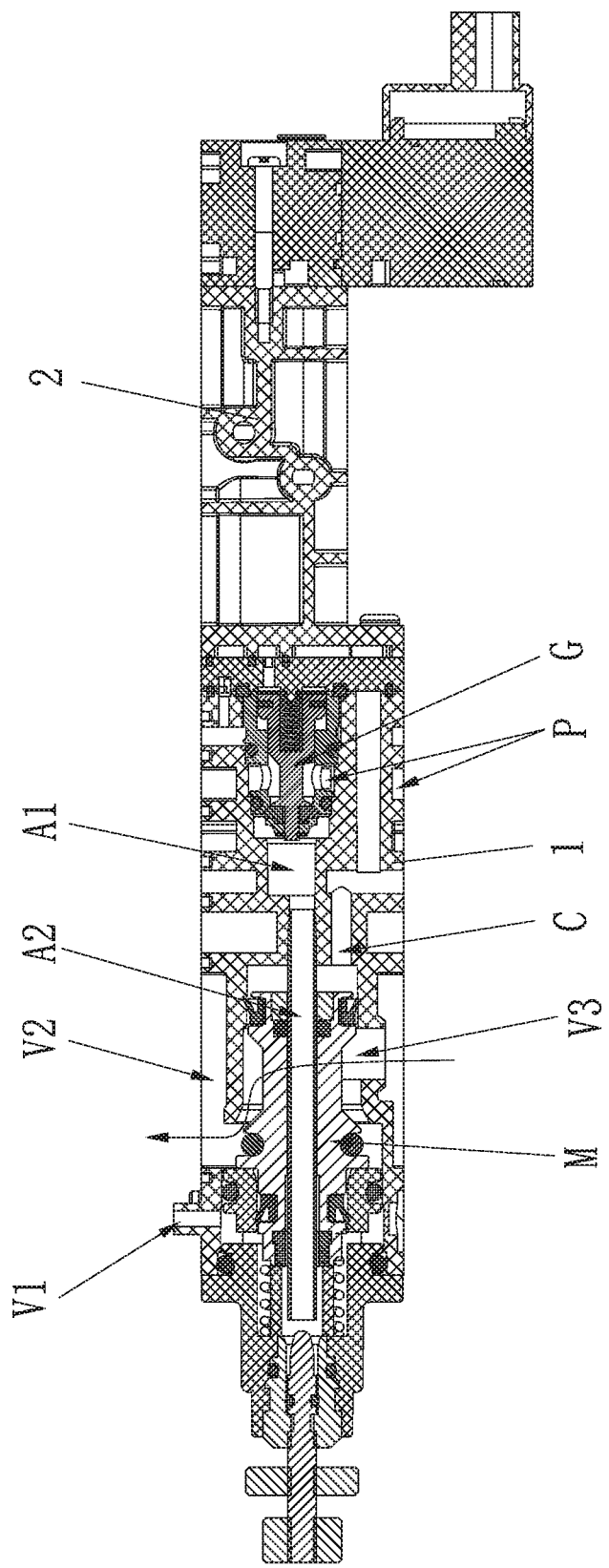
FIG. 6 is a cross-sectional view showing a structure in a vacuum generating state of the present invention.

Vacuum Generating State:

As shown in FIG. 6, the control chamber C inputs a control air pressure, the control air pressure acts on the end surface of the slide core 51, and pushes the slide core 51 to compress the slide core spring 52 to move leftward, the pneumatic on-off valve M is opened. The exhausting chamber V1 is disconnected from the throttle passage A2, the vacuum generating chamber V3 is interconnected to the vacuum interface chamber V2 and the vacuum generating chamber V3 generates a vacuum pressure to make the vacuum interface chamber V2 generate a negative pressure, by this time an article can be sucked by the vacuum interface chamber V2.

Figure 7:
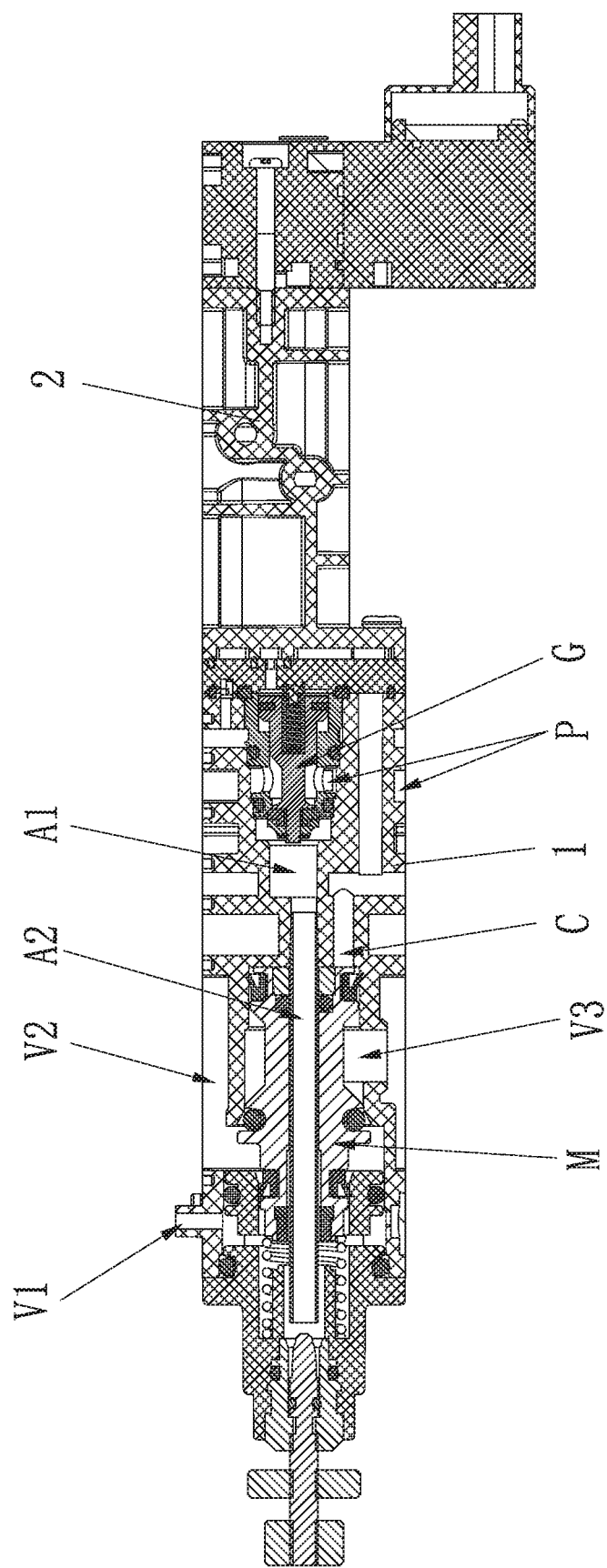
FIG. 7 is a cross-sectional view showing a structure in a vacuum holding state of the present invention.

Vacuum Holding State:

As shown in FIG. 7, when the vacuum interface chamber V2 sucks an article, under ideal state, assuming that the pressure leakage amount of the vacuum interface chamber V2 is 0 (i.e. none), then in order to save energy consumption in generating the vacuum, the control air pressure input by the control chamber C can be removed and the pneumatic on-off valve M is closed to cut off the connection between the vacuum generating chamber V3 and the vacuum interface chamber V2. After the pneumatic on-off valve M is closed, the vacuum interface chamber V2, the exhausting chamber V1, the intake passage A1 and the throttle passage A2 are interconnected, but the communication between the intake passage A1 and the air supply port P is cut off by the pilot valve G, and no pressure relief path is provided; the vacuum interface chamber V2 is kept in a vacuum state. At this time, the article is still sucked in the vacuum interface chamber V2, and can be carried along with the vacuum interface chamber V2.

Figure 8:
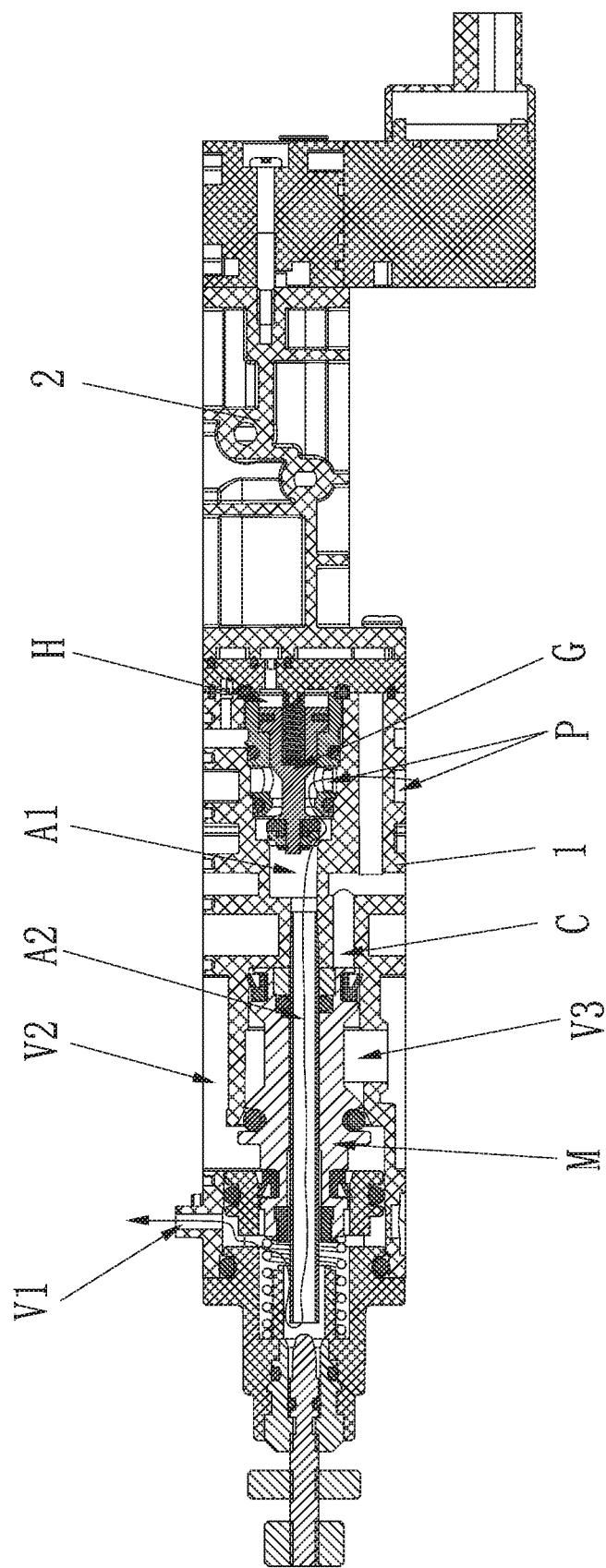
FIG. 8 is a cross-sectional view showing a structure in a vacuum breaking state of the present invention.

Vacuum Breaking State:

In the operating state, the pilot valve spring 33 is compressed by the air pressure of the air supply port P to make the pilot valve core 32 move rightward, the pilot valve G is closed, and the air supply port P and the intake passage A1 are disconnected. As shown in FIG. 8, when the article reaches the designated position, the electromagnetic pilot valve assembly 2 receives a control signal and is activated, and then pressurizes the pilot valve control chamber H, the pilot valve G is open. The pressure of the air supply port P is transmitted to the vacuum interface chamber V2 through the pilot valve G, the intake passage A1, the throttle passage A2, and the exhausting chamber V1, thereby breaking the vacuum environment between the article and the vacuum interface chamber V2. The vacuum state is destroyed to drop the article. The control signal of the electromagnetic pilot valve assembly 2 can be disconnected to return the product to the initial state.

The preferred embodiment of the present invention has been illustrated, and various changes or modifications may be made by those skilled in the art without departing from the scope of the present invention.

What is claimed is:

1. A vacuum breaking device for a vacuum generator, comprising a main housing, wherein the main housing is provided with an air supply port, a vacuum interface chamber and a vacuum generating chamber, an intake passage is arranged inside the main housing, a pilot valve controlled by an electromagnetic pilot valve assembly is arranged between the intake passage and the air supply port, the pilot valve comprises a pilot valve body, a pilot valve core and a pilot valve spring; a throttle pipe is arranged axially inside the main housing, a throttle passage inside the throttle pipe is interconnected to the intake passage, a pneumatic on-off valve is arranged between the vacuum interface chamber and the vacuum generating chamber and outside the throttle pipe, the pneumatic on-off valve comprises a slide core and a slide core spring, and a control chamber mated with an end surface of the slide core is arranged inside the main housing; the main housing is further provided with an exhausting chamber, and when the pneumatic on-off valve is opened, the exhausting chamber, the vacuum interface chamber and the vacuum generating chamber are interconnected;

wherein the main housing is provided with an adjusting mechanism configured for adjusting an opening size of the throttle passage, the adjusting mechanism comprises an adjusting cover, a center of the adjusting cover is screwed with an adjusting core, and an adjusting nut is fixed to an outer end of the adjusting core;

wherein the adjusting core is screwed with an adjusting pad on an inner side of the adjusting nut;

wherein an inner end of the adjusting core is a reduced curved surface structure; and wherein a spring seat is arranged inside the adjusting cover, one end of the slide core spring is sleeved outside the spring seat.

2. The vacuum breaking device for the vacuum generator according to claim 1, wherein a front outer periphery of the slide core is provided with a first Y-type sealing ring, a middle outer periphery of the slide core is provided with a first O-type sealing ring, and a rear outer periphery of the slide core is provided with a second Y-type sealing ring.

3. The vacuum breaking device for the vacuum generator according to claim 2, wherein a front end of the slide core is embedded with a sealing gasket; a rear end of the slide core is embedded with an inner pad, and a second O-type sealing ring is arranged between the inner pad and the slide core.

4. The vacuum breaking device for the vacuum generator according to claim 3, wherein the main housing is provided with a valve fixed part, the electromagnetic pilot valve assembly is fixed to the valve fixed part, and a pilot valve control chamber is formed between the valve fixed part and an end surface of the pilot valve core.

5. The vacuum breaking device for the vacuum generator according to claim 4, wherein the valve fixed part is provided with a bump, and one end of the pilot valve spring is sleeved outside the bump.

6. The vacuum breaking device for the vacuum generator according to claim 5, wherein a first irregular sealing element is arranged between the main housing and the valve fixed part, and a second irregular sealing element is arranged between the valve fixed part and the electromagnetic pilot valve assembly.

* * * * *